United States Patent [19]
Chatten

[11] Patent Number: 4,962,619
[45] Date of Patent: Oct. 16, 1990

[54] APPARATUS FOR DETERRING BIRDS

[76] Inventor: Victor H. Chatten, 1567 W. 215th St., Torrance, Calif. 90501

[21] Appl. No.: 311,725

[22] Filed: Feb. 16, 1989

[51] Int. Cl.$^5$ ............................................. E04H 9/16
[52] U.S. Cl. .................................. 52/101; 119/903; 256/12; 256/52
[58] Field of Search ............... 119/97 AR; 52/101; 256/11, 12, 52, 53, 54, DIG. 1, DIG. 4, 7, 8, 1

[56] References Cited

U.S. PATENT DOCUMENTS

| | | | |
|---|---|---|---|
| 2,258,803 | 10/1941 | Peles | 52/101 |
| 2,304,593 | 12/1942 | Peles | 52/101 |
| 2,777,171 | 1/1957 | Bunnsidel et al. | 52/101 |
| 3,191,239 | 6/1965 | Moore et al. | 52/101 |
| 4,065,103 | 12/1977 | Sweezey | 256/11 |
| 4,143,437 | 3/1979 | Voykin | 119/97 AR |

FOREIGN PATENT DOCUMENTS 1198524  9/1958  Fed. Rep. of Germany ........ 256/11

Primary Examiner—John Weiss
Attorney, Agent, or Firm—Lyon & Lyon

[57] ABSTRACT

Improvements to a bird deterrent apparatus comprising a coiled wire in which the wire is attached to an elongate strip having flaps punched therein which are bent and crimped over the wire to hold it in position, and a spring having bent end loops used to connect adjacent ends of the wire together.

8 Claims, 1 Drawing Sheet

U.S. Patent
Oct. 16, 1990
4,962,619
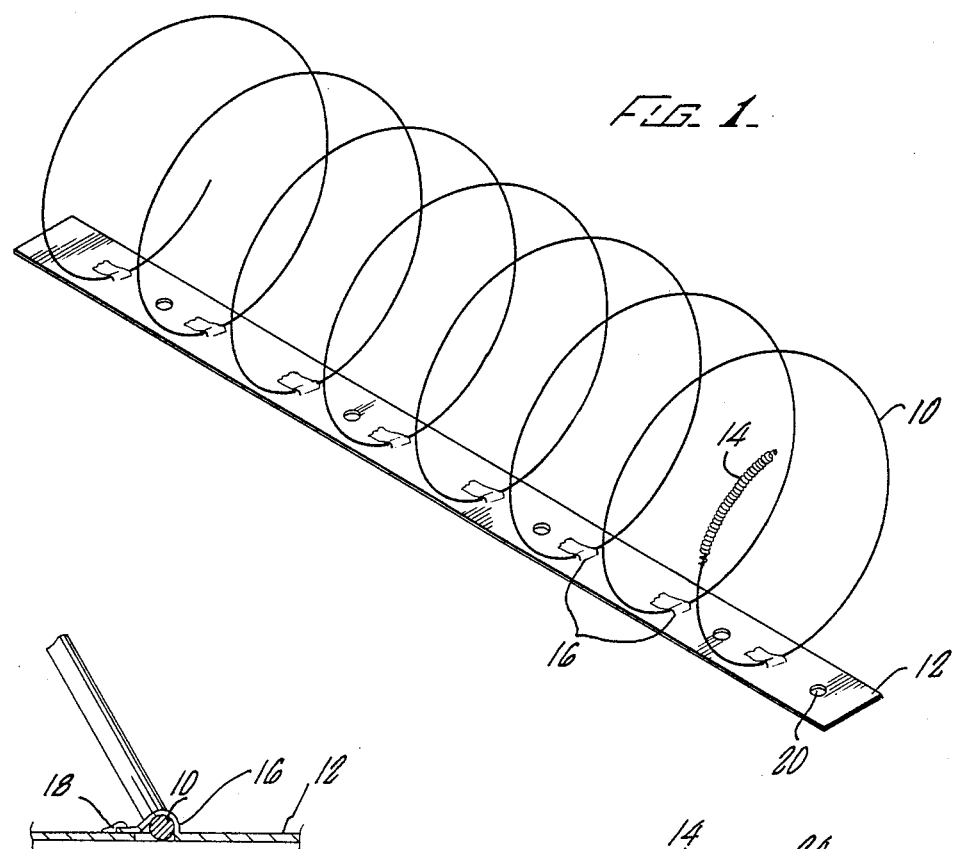
FIG. 1.
FIG. 3.
FIG. 4.
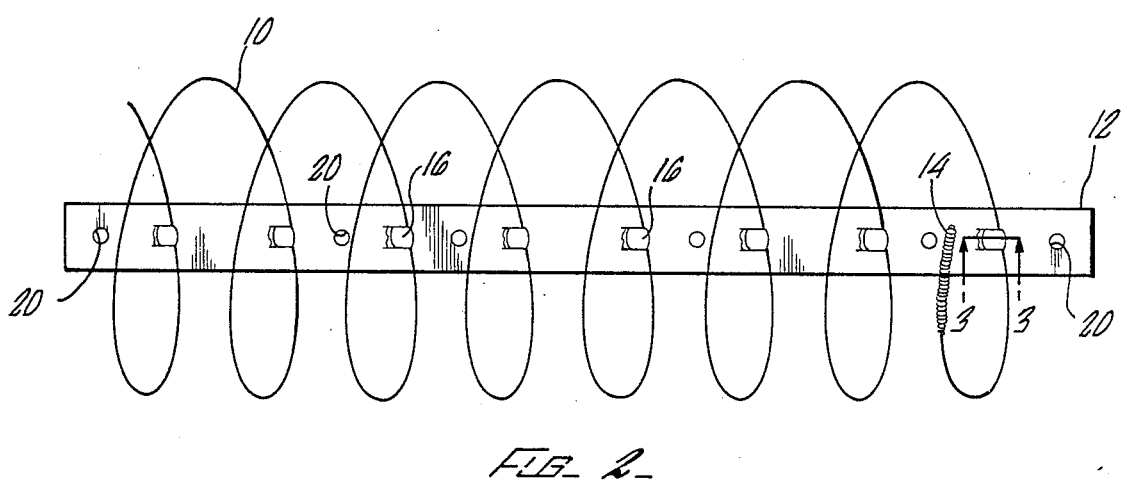
FIG. 2.

APPARATUS FOR DETERRING BIRDS

BACKGROUND

1. Field of the Invention

This invention relates to mechanical apparatus for deterring birds from landing at undesirable locations.

2. Prior Art

Because of the noises they can make, and the mess they can leave behind, birds are not always welcomed. Private as well as public areas can be rendered unsightly and unusable because birds have chosen a nearby overhead position as a favorite perch. The nuisance created by the birds can also be unhealthy as diseases carried in fungi in bird droppings can be communicated to humans. These problems and others can affect the small private residence as well as the large corporate skyscrapers, and every type, size and shape structure inbetween.

In some areas, the pigeon is the primary offending bird. Along the coastlines, seagulls are most troublesome. In other areas, starlings, sparrows, swallows and blackbirds are most often the problem, although there are countless species that can be the culprit.

For these reasons, numerous methods and devices have been utilized and devised to keep birds away. Mock predators, such as owls, hawks or snakes have been erected. Some of these have been quite sophisticated, built to move periodically and to emit sound. But the birds usually quickly discover the ruse, and return, actually perching on their mortal enemy model.

Others have resorted to real-life predators, using peregrin falcons, for example, to disburse pigeons. These real predators, however, are expensive, indiscriminate, unreliable and largely ineffective.

Others have attempted to use a noise deterrence, omitting a reoccurring sharp report to scare the birds away. This, too, is only minimally effective, as the birds become quickly accustomed to the noise. Further, this method is not useful around humans, as the sound is as noisome to them as to the birds.

Other devices and methods which have been employed to combat the bird problem include a gel which is applied to the perch area, giving the bird a chemical hot-foot when it lands in the goo. Ultrasound emitters designed to irritate the birds are also available. These all have drawbacks. The chemical gel is sticky, and therefore dust, dirt and small objects adhere to it, making it unsightly. Also it loses its effectiveness over time. The ultrasound emitters are expensive, need a power source, and are of only limited effectiveness in open areas.

The most utilized prior art device comprises a continuous metal spine from which protrude a repetitive pattern of points prongs. This device is affixed by screws or nails to those areas where the birds would unwantedly perch. Any bird with the temerity to attempt to land on this device painfully realizes his folly.

While this device has proven effective, it is subject to several drawbacks. First, it can be injurious to the birds, as bloodied feet and impaled wings are not unusual. Second, it is potentially injurious to humans who unexpectedly come into contact with it. Third, it is relatively expensive. Fourth, it is somewhat unsightly and harsh in appearance. Fifth, papers and leaves can become impaled upon its tines, creating an eyesore.

Lastly, some people have even resulted to the ultimate sanction, actually killing large numbers of the offending birds in an attempt to frighten them off. This, of course, is highly disfavored as a deterrence means, but it is indicative of the levels of frustration experienced when an area goes literally "to the birds".

This led the inventor to develop a coiled wire device for deterring birds. (See application Ser. No. 076,896, filed July 23, 1987, allowed but not yet issued). Therein, a coiled wire is attached directly to the perch location. A need has arisen, however, for a pre-assembled unit in which the coil spacing is predetermined.

SUMMARY OF THE INVENTION

The apparatus of this invention provides such a preassembled combination in which an expanded-coil wire spiral is affixed to an elongate strip which is in turn attachable to those areas where deterrence to perching is desired. The metal strip has a series of flaps punched along its length at the desired coil spacing. The flaps are bent and crimped over the wire so that it holds the wire in place, but allows the wire to rotate.

To connect the lengths of coiled wire together, a small spring, whose interior diameter is only slightly larger that the exterior diameter of the wire, is provided. The end loops of the spring are bent downwardly so that a compressive force is exerted on the wire when its end is inserted into the spring through the bent end-loops.

DESCRIPTION OF THE FIGURES

FIG. 1 is a perspective view of the apparatus of this invention.

FIG. 2 is a top plan view of the apparatus of FIG. 4.

FIG. 3 is a cross-sectional view taken along line 3—3 in FIG. 2.

FIG. 4 is a close-up, side view of the connector spring having bent end loops.

DESCRIPTION OF THE PREFERRED EMBODIMENT

The device of this invention consists essentially of three parts — the wire coil 10, the metal strip 12 and the connector spring 14.

The wire coil 10 is stainless steel wire extended to form a spiral shape. As described in the previous application, Ser. No. 076,896, filed July 23, 1987, a wire having a thickness of 0.025 inches and a coil diameter of 3½ inches has been found useful with the smaller bird species such a starlings, sparrows, blackbirds and the like. For this size bird, the coils are spread apart approximately 2 inches.

For bigger birds, such as pigeons, seagulls and the like, a thicker wire (0.045 to 0.050 inches), with a coil diameter of 3¾ to 4 inches, and a coil spacing of 3½ to 4 inches (between adjacent loops of the spiral) has proven most effective.

The strip 12 is also preferably made of stainless steel. Any other material of suitable properties could of course be substituted. At appropriate intervals depending upon the desired wire coil spacing, flaps 16 are punched from the strip 12. The flap 16 is bent and crimped over the wire 10 to hold it in position. If desired, a small amount of adhesive 18 can be applied to secure the flap 16. The strip 12 can also have holes 20 punched in it to provide a convenient means for attaching the strip 12 to the perch location.

It will be noted that the wire 10, while held securely in spaced coil arrangement by the flaps 16, is still rotatable therein. Therefore, for shipping, the wire coil 10 can be pushed down flat against the strip and inserted into a plastic sleeve. Once removed from the sleeve, the wire coil 10 returns to its upright position (as shown in FIGS. 1 and 2) ready for installation on the perch location.

The strips 12 can be of any desired length. A 5-foot length has been found useful. The strip 12 and wire coil 10 can be cut quite easily if smaller lengths are necessary. The strips 12 can be attached end to end if a longer span is necessary. In that event, however, it is very important that the wire coil 10 extend continuously along the entire span. Otherwise, birds will perch in the small vacant area.

To connect the wire coil 10 on strip 12 to another, a small metal spring 14 has been found effective. The interior diameter of the spring 14 should be slightly larger that the gauge of wire 10 for easy insertion. The end loops 22 and 24 of the spring 14 are bent downward approximately 90°. The wire 10 is inserted first through the end loops 22 or 24, then into the body of the spring 14. This causes increased pressure between the spring 14 and the wire coil 10, holding them together to form a continuous span along the entire perch location.

Although the invention hereinafter claimed has been shown and described above with particularity, it will be apparent to those skilled in the art that other modifications upon the embodiments shown and described may be made without departing from the invention concepts claimed herein. Accordingly, the scope and protection of this patent are not to be limited to the embodiments specifically shown and described above, but are of the full breath and scope of the appended claims.

What is claimed is:

1. In an apparatus for deterring birds from landing on a perch location, the apparatus having a coiled wire, said wire being of sufficiently light gauge so as not to stably support the weight of the bird to be deterred, but of sufficiently heavy gauge and the individual spirals being of proper size and spacing so as to interfere with the bird's ability to comfortably close it wings, causing it to take flight, the improvement comprising an elongate strip having flaps punched therein at locations consistent with the desired coil spacing, said flaps being bent and crimped over the wire to hold it in position while allowing the wire to rotate, said strip being attachable to the perch location.

2. The improvement of claim 1 further comprising said strip having holes punched therein at convenient intervals through which screws, nails or the like can be inserted to attach the strip to the perch location.

3. The improvement of claim 1 wherein said strip is attached to the perch location by mechanical means.

4. In an apparatus for deterring birds from landing on a perch location, the apparatus comprising essentially adjacent lengths of coiled wire, the improvement comprising connector means for connecting the end of one wire coil to the next, said connector means comprising an elongate spring having loops in which one or more loops at each end are bent downwardly.

5. The improvement of claim 4 in which said loops on said spring are adjacent one another, except for the bent end loops.

6. The improvement of claim 5 in which the coil diameter of said spring is slightly larger than the gauge of the wire to be connected.

7. In a method for deterring birds from landing on a perch location, the method comprising the steps of expanding a coiled length of wire apart such that it has a continuous spiral shape, said wire having a sufficiently light gauge diameter such that the wire in the expanded shape will not stably support the weight of the birds to be deterred, said spirals having a diameter and adjacent spirals being spaced such that the birds to be deterred cannot alight comfortably on or inbetween the wire spirals, the improvement comprising attaching said wire at the ends and at places intermediate of the ends thereof to an elongate strip having flaps punched therein at locations consistent with the desired coil spacing, said flaps being bent and crimped over the wire to hold it in position while allowing the wire to rotate, and attaching said strip to the perch location.

8. The improvement of claim 7 wherein the strip is attached to the perch location by mechanical means.

* * * * *